Nov. 18, 1958 A. WICKESSER 2,860,511
FLUID QUANTITY MEASURING SYSTEM
Filed Nov. 14, 1955 2 Sheets-Sheet 1
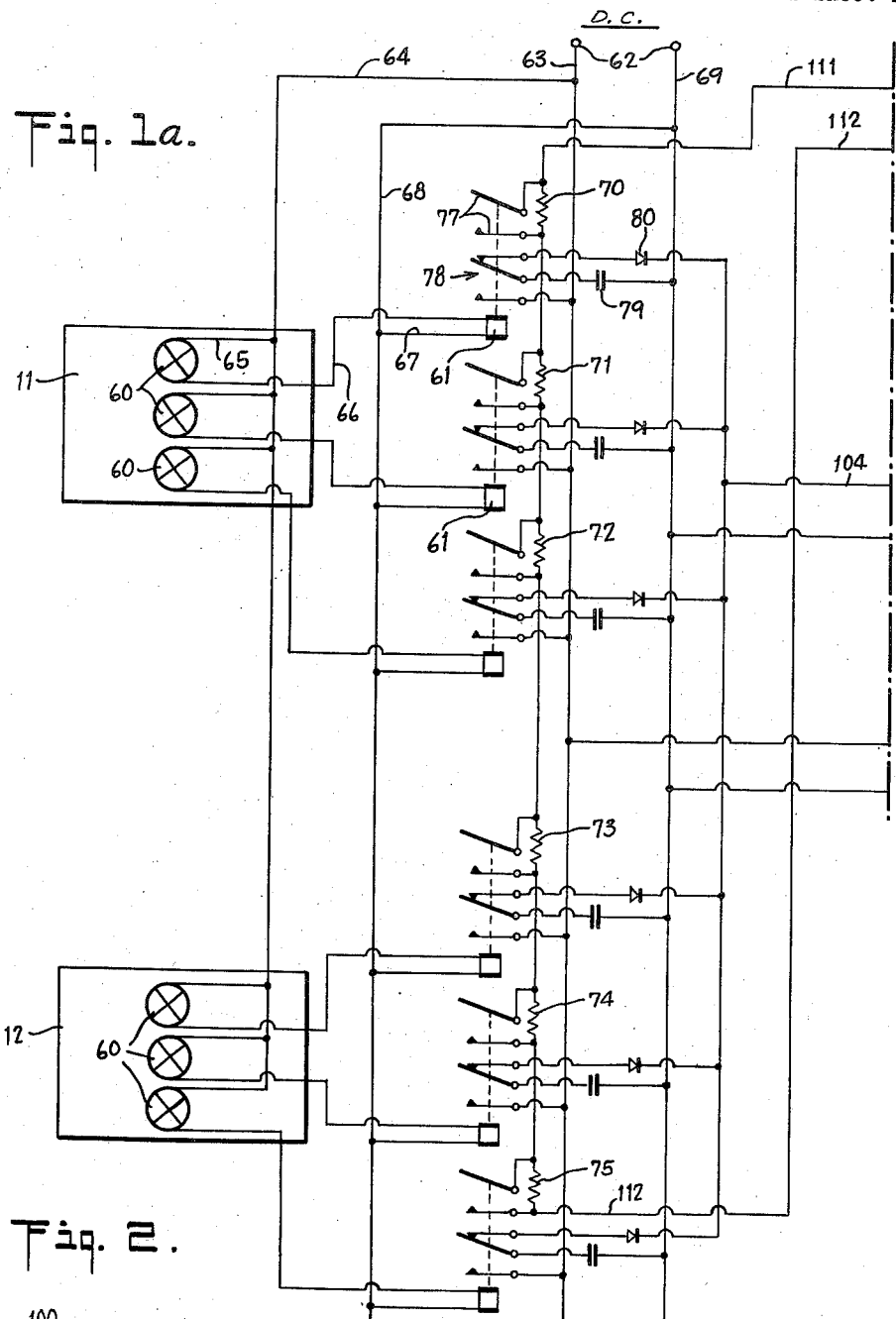
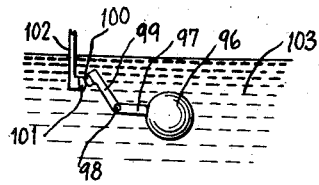
INVENTOR.
ARTHUR WICKESSER
BY R. J. Dearborn
ATTORNEY

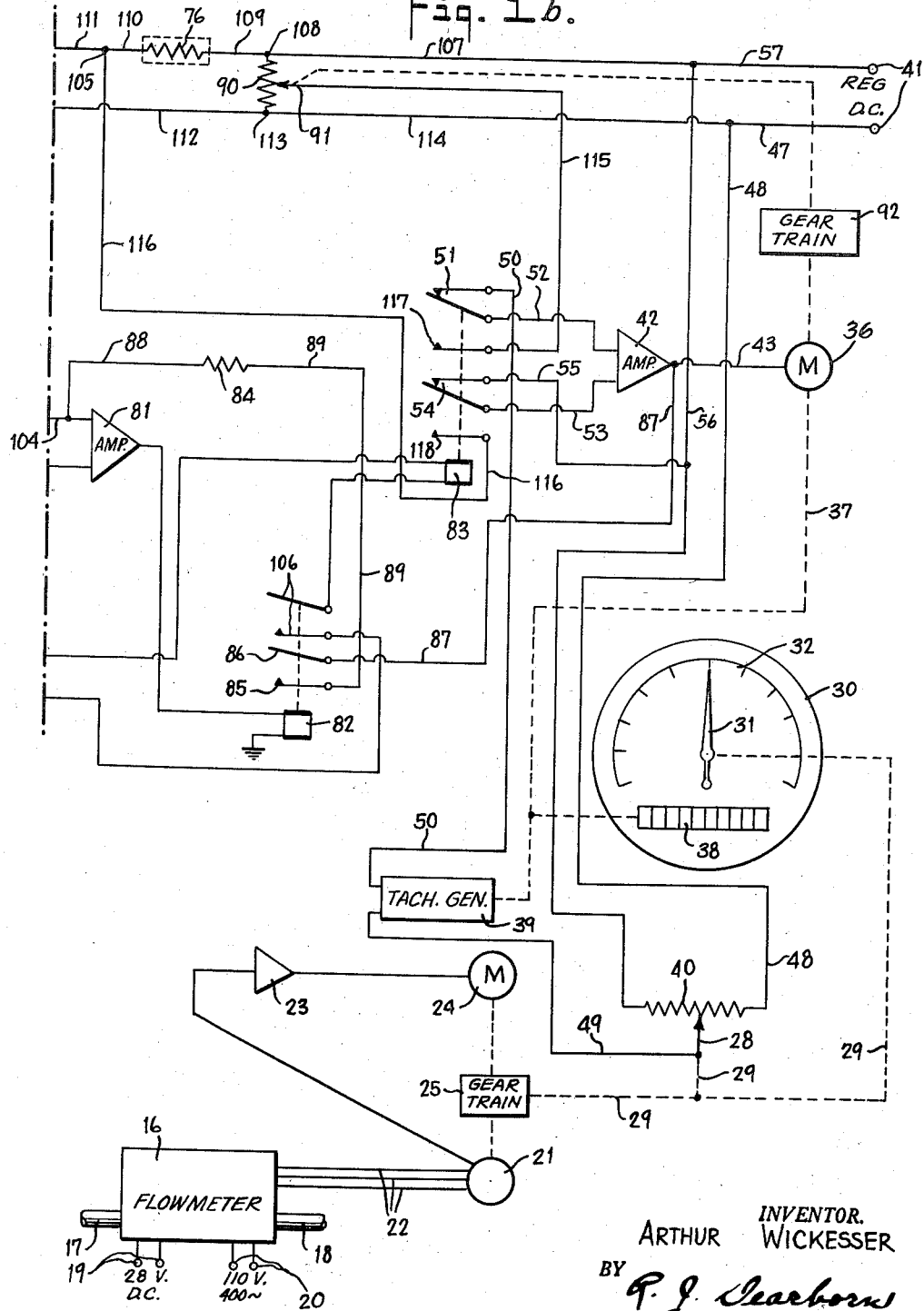

United States Patent Office 2,860,511
Patented Nov. 18, 1958

2,860,511

FLUID QUANTITY MEASURING SYSTEM

Arthur Wickesser, St. Albans, N. Y., assignor to The Liquidometer Corporation, Long Island City, N. Y., a corporation of Delaware Application November 14, 1955, Serial No. 546,525

10 Claims. (Cl. 73—194)

This invention is concerned with a fluid quantity measuring system. More specifically, the quantity measuring system according to this invention is one in which the fluid flow out of a tank or other container is measured by a flow-meter and the total quantity of flow is determined by integrating the rate of flow. In addition, the total amount of fluid flow is checked and corrected, if necessary, at intervals as determined by the level of the fluid in its container. Thus the system is in effect a totalizing flow-meter, which is corrected for actual fluid flow at intervals during the flow of fluid out of its container.

In aircraft fuel quantity measurement it is particularly necessary to accurately measure the quantity of fuel that has been used up at any given time in order to be able to have an accurate indication of the remaining quantity of fuel. Among the problems involved in such measurement of aircraft fuel, are those introduced by the fact that there are a plurality of fuel tanks in most aircraft, and these tanks ordinarily have unsymmetrical or oddly shaped configurations. One solution to the problem would be that of measuring the quantity of fuel flow from any and all of the tanks on its way to the motor. However, such a solution has not heretofore been practical because any known flow meter is sufficiently inaccurate that over the period of time involved in using fuel from the tanks, errors in indication would accumulate to an extent that would render the determination extremely inaccurate, particularly when the majority of the fuel had been consumed.

Consequently, it is an object of this invention to provide a fluid flow measuring system whereby the quantity of fluid flowing out of a given container or group of containers is continuously measured and integrated to provide a total flow indication. At the same time such indication is corrected accurately to indicate the amount of fluid that has been measured, by means of check points, as obtained from the level of the fluid remaining in the containers.

Briefly, the invention concerns a fluid quantity measuring system for determining the total amount of fluid that has flowed out of a predetermined quantity of confined fluid. Such system comprises means for measuring the rate of flow of said fluid out of said predetermined quantity, and also means for integrating said rate of flow with respect to time in order to determine the total quantity of fluid flow. The system also comprises means for independently determining the reduction of the quantity of the confined fluid by a predetermined amount of the full quantity, and means actuated by said independent means for correcting said total quantity determination at the time that said predetermined amount of reduction is reached.

A system according to this invention is described below in accordance with the applicable statutes and is illustrated in the drawings, in which:

Figures 1a and 1b together constitute an electrical schematic diagram with schematic showings of the mechanical elements involved; and Figure 2 is an illustration of a fluid level actuated switch which may be employed as one of the fluid level-sensitive elements in Figure 1a.

The system may take various forms as will be clear to anyone skilled in the art. However, a preferred system in accordance with the invention is illustrated in Figures 1a and 1b wherein there is shown a plurality of fuel tanks 11 and 12 which have a known total capacity and which contain the fluid that is to be measured in quantity, as it is withdrawn.

It will be noted that although only two tanks 11 and 12 are illustrated, any number of tanks may be employed as desired. The use of two tanks in the illustration, is merely for purposes of clarity in the disclosure. It will be observed also that whereas this description is made in terms of the containers 11 and 12 being fuel tanks for an aircraft, this is no more than a specific illustration of one use for the system. In other words, in any application where one or more fluid containers are arranged so that the fluid is withdrawn therefrom, and the level of such fluid in the containers may be measured, the system of this invention will be readily applicable.

The fuel that is withdrawn from tanks 11 and 12 flows through a flow meter 16 (Figure 1b), which has fluid pipes or tubes 17 and 18 in connection therewith, for introducing the fluid into and withdrawing the fluid out of, the flow meter. This flow meter 16 may be any conventional meter for measuring the rate of flow of fluid therethrough, e. g. a standard type commercially available mass flow meter, like one manufactured by General Electric Co., may be employed. The details of this flow meter form no part of this invention, per se, but it will be noted that the flow meter illustrated employs two sources of electrical energy; one pair of terminals 19 being for a 28 volt D. C. supply while another pair of terminals 20 are for a 110 volt 400 cycle supply.

In connection with flow meter 16, there is also an electric servo transformer 21 that is electrically connected to the flow meter by three wires 22 in a conventional manner. An output signal from the transformer 21 is fed to an amplifier 23 that in turn energizes an A. C. electric servo motor 24. Motor 24 is mechanically connected via a gear train 25 to position the rotor of servo transformer 21 in accordance with the rate of flow as being measured by flow meter 16.

Also connected to motor 24 for mechanical positioning thereby in direct correspondence with the rotor of transformer 21 is a potentiometer slider arm 28, to which it is mechanically connected by means of any appropriate mechanism, e. g. that indicated by dashed lines 29. At the same time as motor 24 positions slider arm 28 (in accordance with the rate of flow of fluid through flow meter 16), it positions an indicator 30, which has a pointer 31 and a calibration scale 32 in connection therewith, for indicating the rate of flow of the fluid through the flow meter 16.

As the rate of flow of fluid is measured and indicated in accordance with the above description, there is an arrangement for integrating this rate of flow measurement with respect to time, so as to obtain a total quantity of flow indication. This is accomplished by having an electric motor 36 connected mechanically as indicated by a dashed line 37 to a revolution counter 38. Counter 38 may be conveniently located adjacent to the rate of flow indicator 30. Also mechanically connected to the motor 36 to be driven thereby is a tachometer generator 39 that is electrically connected in series with the slider arm 28 of a potentiometer resistor 40. The polarity of the tachometer generator 39 will be made to oppose the voltage of the potentiometer 40 in the usual manner, in order to ensure that the speed of rotation of the motor 36 will always remain directly proportional to the voltage taken from the potentiometer 40. It will be observed that resistor 40 is connected directly across an appropriate source of D. C. voltage that is connected to a pair of terminals 41. It is important to have this source of D. C. remain relatively constant in voltage, so that it is preferred to have the D. C. source which is connected to terminals 41 one that is regulated. The speed of rotation of the motor 36 is thus controlled by, so as to be directly proportional to, the position of slider arm 28 on potentiometer resistor 40. This is true because the voltage signal which is picked off the slider arm 28 is connected in series opposition with the tachometer generator 39. This is necessary because the motor 36 would tend to run at a speed dependent on load and other factors in the absence of the tachometer generator. But with the tachometer generator 39 connected as indicated the output thereof causes a balance to be reached for any given speed, since the faster the motor 36 runs the greater is the output voltage from tachometer generator 39 to oppose the input voltage from potentiometer 40. The difference between these two voltages is what energizes the motor 36, and it increases in direct proportion to the increase in the potentiometer output voltage. It will be noted that motor 36 is energized from the output of an amplifier 42 via an electric circuit as indicated by a wire 43.

The motor 36 is driven from the output of amplifier 42, at a speed proportional to the potential of that output. The input signal to amplifier 42 (which is also proportional to the output potential) is the algebraic sum of two opposed component potentials. One of the component potentials is that at slider 28, and is a measure of the rate of flow. The other is the output potential of tachometer generator 39, which is a measure of the speed of motor 36.

For any given position of slider 28, the motor 36 will reach a speed such that the potential of generator 39 balances a portion only of the potential at slider 28, that portion being whatever is necessary to hold the resultant signal reaching amplifier 42 at a value which will maintain the motor speed constant.

For example, consider that the system is starting up, with motor 36 stationary and slider 28 at the position shown. The tachometer generator potential is then zero, so that the full slider potential is impressed on the amplifier and, in amplified form, on the motor 36. Motor 36 starts and accelerates and as it accelerates, the tachometer generator potential increases, thereby cutting down the amplifier input signal. This action continues until a balance point is reached where the tachometer generator output is just enough to cut the amplifier input signal down to a value where the motor speed is held constant. The motor speed is then proportional to the slider position; and any change in the slider position will produce a balancing change in the motor speed. It can, therefore, generally be said that the speed of the motor 36 will be made exactly proportional to the setting of the potentiometer slider 28.

It is pointed out that the circuit diagram of Figures 1a and 1b is schematic, in that the actual wiring circuits are not shown. Rather, the circuits are conventionally indicated, as for example, by the one wire 43 shown for energizing motor 36.

When the motor 36 is acting to integrate the rate of flow in accordance with the above described operation thereof, the input signal for energizing the motor is introduced to the amplifier 42 over a circuit which may be traced as follows: Beginning at a wire 47 that is connected to one of the terminals 41, the circuit may be followed over a wire 48 to one side of the potentiometer resistor 40. Then the circuit may be continued via slider arm 28 of the potentiometer 40, and a wire 49 that leads to the output of the tachometer generator 39. Then from the other side of the output of tachometer generator 39, the circuit may be continued via a wire 50 to a set of relay contacts 51 that are closed when the relay is de-energized. Then from contacts 51 the circuit may be continued via a wire 52 to one input connection of the amplifier 42, while the circuit from the other input connection of amplifier 42 continues via a wire 53 to closed contacts 54 and then via a wire 55 to a wire 56 and finally to a main wire 57 which leads to the other D. C. input terminal 41.

By reason of this arrangement as so far described, two measurements are continuously effectuated. First, the rate of flow of the fluid through flow meter 16 is continuously measured by the operation of motor 24, which positions slider arm 28 of the potentiometer 40 as well as the pointer 31 of rate flow indicator 30. Second, at the same time the rate of flow determination is integrated with respect to time, by reason of the circuit connection for energizing motor 36 so that it will run at a speed proportional to the rate of flow determination. This is so because the slider arm 28 is made to correspond to the rate of flow determined by flow meter 16, which is accomplished by having the tachometer generator 39 with its voltage output in series opposition to the input signal from potentiometer 40. Thus the motor 36 will run at a speed proportional to the rate of flow of the fluid, and its speed will be integrated by use of a revolution counter 38 which may be calibrated in terms of total flow of the fluid.

While the portion of the system thus far described would provide an indication of the total quantity of fluid flow out of the tanks 11 and 12, this would be relatively inaccurate since any flow meter has definite limitations in its accuracy. In order to overcome this inaccuracy, there is provided in each of the tanks 11 and 12 a plurality of liquid level-sensitive elements 60. These elements 60 may take various forms; one arrangement is shown by a schematic illustration of a simple float actuated switch (see Figure 2). These liquid level-sensitive elements are located at predetermined levels within each tank 11 and 12, so that as the fluid level within the tank reaches each element 60 in turn, the quantity of fluid which has flowed out of the tank is accurately known. In this regard it may be noted that an optimum physical location within each tank may be found, such that the level of the liquid remains the same irrespective of tipping of the tank about any given axes, within fairly wide limits.

Each of the liquid level-sensitive elements 60 is connected in an electric circuit with a corresponding relay coil 61; and since each of the circuits for liquid level elements 60 and their corresponding relay coils 61 is identical, only one of these circuits need be described in detail. Choosing the upper element 60 in tank 11, it will be noted that a D. C. source of electric energy may be connected to a pair of terminals 62. Then the associated relay coil 61 is energized (in accordance with the liquid level indication determined by element 60) by reason of a circuit which may be traced as follows: from a main D. C. supply wire 63, the circuit chosen includes a wire 64 that has a wire 65 connected thereto. Wire 65 leads to one side of the liquid level-sensitive element 60. Then from the other side of element 60 the circuit may be continued via a wire 66 which leads to one side of the relay coil 61. Then the completion of the circuit may be traced via a wire 67 and another wire 68 which leads to the other main D. C. supply wire 69.

It will be noted that in Figures 1a and 1b a convention is employed whereby all relay contacts are illustrated in their de-energized positions.

Actuation of the relay 61 (when the above traced circuit is closed) causes two circuits to be affected. One of these is, in each case, a circuit that involves one of a series of resistors, e. g. a resistor 70. There is a separate resistor in connection with each relay 61, and in the system illustrated there are six of these resistors which are numbered 70 through 75, inclusive. The circuit controlled by each relay coil 61 which affects the corresponding series resistor 70 through 75, is a short circuiting arrangement involving relay contacts 77. It will be observed that these resistors 70 through 75 are connected in series across the regulated D. C. source connected to terminals 41, with a current limiting resistor 76 in series therewith. Resistor 76 is necessary to avoid a short circuit across the source connected to terminals 41, and this resistor may be made variable in order to introduce compensations as desired. In this connection, resistor 76 might take the form of a density-sensitive apparatus as shown in the reissue patent to De Giers, No. Re. 24,075, reissued October 18, 1955.

The other circuit which is controlled by each relay 61, involves the double throw contacts 78 (of each relay 61) and acts to transfer a circuit for a condenser 79 from a charging connection to a discharging one. Thus when double throw contacts 78 of a relay 61 are in the lower position (as viewed in Figure 1a) on energizing the relay the condenser 79 will be connected directly across the D. C. source connected to terminals 62. Then when the relay coil 61 is de-energized and the double throw contacts 78 take up the illustrated position, condenser 79 is connected to discharge over a circuit including a rectifier 80 and leading to one input connection for an amplifier 81 (Figure 1b).

Amplifier 81 has its output circuit connected to a relay coil 82, which has the other side thereof connected to ground as illustrated. The relay 82, in turn, controls the energization of a relay coil 83 which has its contacts in the input circuit for the amplifier 42 (which controls the motor 36).

It will be noted that there is a holding circuit involving relays 82 and 83, which acts to maintain these relays energized following their initial energization, until the signal causing an energization of the motor 36 falls below a predetermined low level, i. e. in effect becomes zero. This holding circuit will have its action explained in connection with the operation of the system as set forth below. However, the elements thereof may be here noted as follows: A resistor 84 is connected from one input of amplifier 81 via a wire 88, and to a contact 85 of the relay 82 via a wire 89. Then the remaining elements of the holding circuit include a cooperating contact 86 of the relay 82 and a wire 87 connected thereto, which leads to the output of amplifier 42.

It will be observed that there is a potentiometer 90 that is connected across the regulated D. C. supply, that is introduced at terminals 41. This potentiometer 90 has a sliding contactor 91 in conjunction therewith which is mechanically positioned by means of a gear train 92 that connects the motor 36 with the slider 91. This mechanical arrangement is schematically indicated by dashed lines in the conventional manner, and it is to be noted that the arrangement is such that slider 91 will be in its extreme lowermost position when the tanks 11 and 12 are completely full of liquid. Then as the liquid flows out of the tanks and the motor 36 runs to provide the total flow indication, it drives the slider 91 upward across potentiometer 90.

The potentiometer 90 and its sliding contactor 91 are connected in an electric circuit which is in the nature of a Wheatstone bridge, and which provides an output circuit from such bridge to the input of amplifier 42. This bridge output signal when connected to the amplifier 42, will cause motor 36 to run in the proper direction so as to correct the position of slider arm 91 on the potentiometer 90 in accordance with the amount of resistance that is introduced by the opening of short circuiting connections around each of the series resistors 70 through 75. This action will be more fully described in connection with the operation of the system.

Figure 2 illustrates one arrangement which may be employed for each of the liquid level-sensitive elements 60. The arrangement shown includes a float element 96 which may be spherical, as illustrated, and which is connected to the extremity of an arm 97. Arm 97 is pivoted at a point 98, and may have an integrally formed arm 99 attached thereto and pivoted about the same point 98. At the extremity of arm 99 there is a contact 100 which cooperates with a stationary contact 101 carried by an arm 102. It will be observed that the operation of the float-actuated contacts 101 and 100 is such that while the float 96 is submerged in a liquid 103, the contact 100 will be urged against the stationary contact 101 to complete an electric circuit therewith. Then as the level of liquid 103 falls to the point where float 96 is no longer urged upwardly, or counterclockwise about the pivot 98, it will tend to fall downwardly or pivot clockwise about pivot point 98 and thus cause movable contact 100 to separate from stationary contact 101 and open the electric circuit. It will be observed that by predetermined arrangement of the elements and their location, the separation of contacts 100 and 101 will occur at a definite level of the liquid 103.

*Operation*

The operation of the system may be described as follows: The liquid contained in tanks 11 and 12 is withdrawn via appropriate pipes (not shown) and passes through the flow meter 16 where the rate of flow thereof is measured. This rate of flow is continuously indicated by the pointer 31 on scale 32 and at the same time causes energization of the motor 36 at a speed proportional to this rate of flow. Thus the revolution counter 38 is driven to indicate the total quantity of fluid which has flowed out of the tanks. Whenever the level of the liquid in one of the tanks, e. g. tank 11, falls to a predetermined point so that the level-sensitive element 60 is actuated, the connected relay coil 61 is deenergized by means of the circuit already described in detail.

It may be noted here that the arrangement could be such that the relays 61 would be energized upon the liquid level reaching each predetermined point, but in such case, the details of the arrangement would have to be varied to meet these conditions.

When the relay 61 is de-energized, its contacts 77 and 78 cause two things to take place simultaneously. One of these is removal of the short circuit from around the resistor 70, so that a predetermined potential will exist at a point 105 (Figure 1b) in the Wheatstone bridge circuit. At the same time the double throw contacts 78 will cause initiation of a total flow correcting operation by reason of switching the circuit for condenser 79 from a charging state to a state in which it discharges to the input circuit of the amplifier 81.

Condenser 79, which was charged to the full voltage of the source at terminals 62, will then be caused to discharge over its circuit including rectifier 80 which leads to the input circuit for amplifier 81 (Figure 1b). This input circuit is connected in common to each of the double throw contacts 78 of each relay 61 circuits by a wire 104 (Figures 1a and 1b). This discharge pulse of energy from condenser 79, is amplified by the amplifier 81 and applied to the coil of relay 82 so as to energize the same. Upon energization of relay 82, its contacts are actuated and the above described holding circuit, which includes resistor 84 and the now closed contacts 85 and 86, is completed.

Actuation of relay 82 closes another set of contacts 106 thereon, which are in a circuit for energizing the relay 83. The circuit for thus initially energizing coil 83 via contacts 106, may be readily traced to each of the main D. C. source wires connected to terminals 62. Therefore, relay 83 is in turn energized. Actuation of relay 83 switches the input circuit for amplifier 42 from that described in detail above, to an input circuit which is taken from the output of the Wheatstone bridge circuit. The Wheatstone bridge circuit includes potentiometer 90, resistor 76, and the variously short circuited resistors 70 through 75.

Now when this switch-over occurs, a check is had on whether the total flow indication is correct, as accurately determined by the actual fluid level in the tanks. This is true since the slider 91 of potentiometer 90 is being driven in direct correspondence with the total fluid flow indication, as made by the revolution counter 38. Consequently, should there be an error so that the slider 91 of potentiometer 90 is above or below the accurate position for the then fluid quantity determination, as made by the liquid level-sensitive elements; a signal will be set up in the output of the bridge, and since it is at that time connected to the input of the amplifier 42, this signal will cause motor 36 to run in the proper direction so as to eliminate this error.

When the error signal from the bridge is thus reduced to zero, no signal from amplifier 42 will be carried to the motor 36 and it will stop at the correct total flow indication. At the same time this lack of signal will cause a termination of the holding action that was set up in connection with relays 82 and 83 by reason of the holding circuit involving contacts 85, 86 and resistor 84. Assuming that the relays 82 and 83 have been energized and that there is an output potential from the Wheatstone bridge circuit which is capable of operating the motor 36 through the amplifier 42, then one of the conductors included in the so-called "wire 43" carries an active potential which is transmitted through the wire 87, the relay contacts 86 and 85, which are momentarily closed by the energization of the relay 82, the wire 89, the resistor 84 and the wire 88 to the input of the amplifier 81. This potential will be amplified by the amplifier 81 and will be sufficient to maintain the relay 82 energized, even after the termination of the initial pulse derived from the discharge of the condenser 79. This condition is maintained as long as there is a sufficient potential being transmitted from the amplifier 42 to the motor 36 to operate that motor. When, however, the motor 36 ceases to operate due to the Wheatstone bridge circuit being brought to a new balance condition, there is no longer any potential through the path traced including the resistor 84 and so no potential to be amplified by the amplifier 81. The relay 82 will then drop out, opening not only the holding circuit between relay contacts 86 and 85, but also opening the circuit to relay 83 at contacts 106. This will cause relay 83 to drop out, returning all the parts to their positions shown in the drawings. When the relays 82 and 83 are thus de-energized the input circuit for amplifier 42 will go back to that originally described, whereby the motor 36 will be driven in accordance with the rate of flow of the fluid through the flow meter 16, once more.

Thus it will be observed that any number of predetermined correction points, or levels, may be set up for a fluid tank, or a system of a plurality of fluid tanks, such that a totalizing flow indication system may be corrected as required in accordance with the accurately determined quantity of fluid which has flowed out of the tank system.

*Details of Wheatstone bridge circuit*

It is pointed out that the Wheatstone bridge arrangement for providing a correction signal includes the variable short circuited resistors 70 through 75, and the input and output circuits thereof may be traced as follows: The input or energization of the bridge circuit is had by reason of the connection of potentiometer resistor 90 directly across the regulated D. C. source that is connected to terminals 41, as clearly illustrated. Thus potentiometer resistor 90 forms two arms of the bridge circuit, one being on either side of the sliding contactor 91. The other two arms of the bridge are made up of the resistor 76 and one or more of the resistors 70 through 75, as their short circuits are removed.

In this regard, it may be noted that a complete circuit may be traced from one of the terminals 41 via the wire 57 and a wire 107 to a point 108 at one end of the potentiometer resistor 90. This circuit may be then continued via a wire 109 to one side of the resistor 76. Then from the other side of resistor 76 over a wire 110 to the point 105 where one of the output connections is made. The circuit may then be continued over a wire 111 to one side of resistor 70, which is connected in series with each of the additional resistors 71 through 75 whenever the short circuit for each is removed. The circuit being traced may then be continued from the other side of the last resistor 75 via a wire 112 and back to a point 113 at the other end of the potentiometer resistor 90. Finally, this circuit may be completed from point 113 via a wire 114 and the wire 47 to the other terminal 41.

The output circuit for the Wheatstone bridge may be traced from the slider contact 91 of the potentiometer 90 over a wire 115 to a lower contact 117 of relay 83 and then via the wire 52 to an input of the amplifier 42. The circuit continues via the wire 53, a lower contact 118 of the relay 83 to a wire 116, which is connected to the point 105 of the bridge circuit. The potential of point 105 is determined by the number of resistors, 70 through 75, that are included in the circuit.

As was indicated above, the resistor 76 may be made variable under control of any desired function in order to introduce such function to the system. For example, it is contemplated that the resistor 76 may be a variable resistance which is controlled by the density of the fuel in the tanks 11 and 12. Thus a correction may be introduced for changes in density of the fuel, which changes in density would otherwise introduce errors in the total fluid flow indication.

While a specific illustration of the invention has been described in some detail in accordance with the applicable statutes, this is not to be taken as in any way limiting the invention, but merely as being descriptive thereof.

It is claimed:

1. A fluid quantity-measuring system for indicating the total amount of fluid that has flowed out of a predetermined quantity of confined fluid, comprising means for measuring the rate of flow of said fluid out of said predetermined quantity, power-actuated means for integrating the rate of flow with respect to time in order to determine the total quantity of fluid flow, means for indicating the amount of fluid which has flowed out of said predetermined quantity as thus determined; independent means for accurately determining when the quantity of the confined fluid has been reduced to a predetermined amount which is less than said predetermined quantity; and automatic means, initiated in its operation by said independent means, for adjustably changing the value shown by said indicating means to correspond with said predetermined amount.

2. A fluid quantity-measuring system for determining the total amount of fluid that has flowed out of a predetermined quantity of confined fluid, comprising means for measuring the rate of flow of said fluid out of said predetermined quantity, power-actuated means for integrating said rate of flow with respect to time in order to determine the total quantity of fluid flow, means normally driven by said integrating means for indicating the amount of fluid which has flowed out of said predetermined quantity as thus determined; fluid level-sensitive means located in said confined quantity of fluid for determining when a given amount of said fluid has flowed out, means independent of said flow measuring means and said integrating means but including said level-sensitive means for accurately determining, at least from time to time, the amount of said fluid which has flowed out of said predetermined quantity; and switching control means (a) for temporarily transferring control of said indicating means from said integrating means to said independent means for a period sufficient for the adjustive correction of the value indicated by said indicating means in accordance with the value as accurately determined by said independent means and (b) for thereafter returning control of said indicating means to said integrating means.

3. A fluid quantity measuring system for determining the total amount of fluid that has flowed out of a predetermined quantity of confined fluid, comprising means for measuring the rate of flow of said fluid out of said predetermined quantity, electric motor means for integrating said rate of flow with respect to time in order to determine the total quantity of fluid flow, fluid level-sensitive means located in said confined quantity of fluid for determining when a given amount of said fluid has flowed out, means for comparing the quantity of confined fluid actually removed with the total quantity of fluid flow as determined by said electric motor means, and circuit means including said fluid level sensitive means for switching control of said motor means from said rate of flow means to said comparing means periodically as determined by said level sensitive means so that the total quantity determination is thus periodically corrected.

4. A fluid quantity measuring system for determining the total amount of fluid that has flowed out of a predetermined quantity of confined fluid, comprising means for measuring the rate of flow of said fluid out of said predetermined quantity, electric signal generating means actuated by said rate of flow measuring means for providing an electric signal that is proportional to said rate of flow, electric motor means controlled by said electric signal for integrating said rate of flow with respect to time in order to determine the total quantity of fluid flow continuously, fluid level-sensitive means located in said confined quantity of fluid for determining when a given amount of said fluid has flowed out, electric circuit means including an element actuated by said level-sensitive means and an element actuated by said electric motor means for comparing the quantity of confined fluid actually removed with the total quantity of fluid flow as determined by said electric motor means, and additional circuit means controlled by said fluid level-sensitive means for switching control of said electric motor means from said electric signal to said first named electric circuit means momentarily until the element actuated by the electric motor agrees with the element actuated by the level-sensitive means in order to correct the total quantity of fluid flow determination.

5. A fluid quantity measuring system for determining the total amount of fluid that has flowed out of a predetermined quantity of confined fluid, comprising means for measuring the rate of flow of said fluid out of said predetermined quantity, electric signal generating means actuated by said rate of flow measuring means for providing an electric signal that is proportional to said rate of flow, electric motor means controlled by said electric signal for integrating said rate of flow with respect to time in order to determine the total quantity of fluid flow continuously, fluid level-sensitive means located in said confined quantity of fluid for determining when a given amount of said fluid has flowed out, electric circuit means including a variable impedance element varied by said level sensitive means and another variable impedance element varied by said electric motor means, said variable impedance elements being connected to form a bridge network, the output of which may be connected to control said electric motor means, and additional circuit means controlled by said fluid level-sensitive means for switching control of said electric motor means for said electric signal to said first named electric circuit means momentarily until the element actuated by the electric motor agrees with the element actuated by the level-sensitive means in order to correct the total quantity of fluid flow determination.

6. A fluid quantity measuring system for determining the total amount of fluid that has flowed out of a predetermined quantity of confined fluid, comprising means for measuring the rate of flow of said fluid out of said predetermined quantity, electric signal generating means actuated by said rate of flow measuring means for providing an electric signal that is proportional to said rate of flow, electric motor means controlled by said electric signal for integrating said rate of flow with respect to time in order to determine the total quantity of fluid flow continuously, an indictator connected to said electric motor means for indicating the total quantity of fluid flow as determined thereby, fluid level-sensitive means located in said confined quantity of fluid for determining when a given amount of said fluid has flowed out, first electric circuit means including a variable resistance element varied by said level-sensitive means and another variable resistance element varied by said electric motor means, said variable resistance elements being connected to form a Wheatstone bridge network having an output circuit, second electric circuit means controlled by said level-sensitive means for switching control of said electric motor means from said electric signal to said Wheatstone bridge output circuit, and means for maintaining said control switched to the Wheatstone bridge until the output thereof is substantially zero.

7. A fluid quantity measuring system for determining the total amount of fluid that has flowed out of a predetermined quantity of confined fluid, comprising means for measuring the rate of flow of said fluid out of said predetermined quantity, means for introducing a source of electrical potential to the system, a potentiometer electrically connected across said potential source and having a sliding contactor thereon for providing a variable signal output therefrom, means for connecting said rate of flow measuring means to said sliding contractor in order to control said variable signal output accordance with the rate of flow of the fluid, an electric motor having a tachometer generator driven thereby, first circuit means for connecting said sliding contactor in series with said tachometer generator in order to cause the motor to run at a speed proportional to the rate of flow of fluid, a revolution counter driven by said motor to integrate the rate of flow of fluid with respect to time and indicate the total quantity of fluid flow; a plurality of float-actuated electric switches located at predetermined levels in said confined fluid to determine when predetermined amounts of fluid have flowed out, a plurality of relays each connected to one of said float-actuated switches respectively, each of said relays having contacts for controlling two separate circuits, one of said two separate circuits being a shunt path for each of a series of resistors, the other of said two separate circuits being one of a plurality of parallel input circuits for an amplifier, each said input circuit including a condenser that is connected to be discharged into said amplifier; a Wheatstone bridge circuit including said series of resistors as one arm thereof and a compensating resistor as an adjacent arm thereof as well as a potentiometer-connected resistor having a movable contactor thereon as the two opposite arms thereof, second circuit means including a switch for connecting the output of said Wheatstone bridge circuit to control the energization of said electric motor, said movable contactor being driven by said electric motor; third circuit means including said amplifier and means for controlling the actuation of said switch, and a holding circuit associated with said third circuit for maintaining the energization of said electric motor under control of said Wheatstone bridge until the bridge is substantially balanced so that the total fluid flow indication by said revolution counter will be corrected in accordance with the level of the fluid as determined respectively by each of said float-actuated switches in turn.

8. A liquid quantity-measuring system for determining the amount of liquid withdrawn from a predetermined total quantity, comprising rate of flow measuring means located in the path of flow of said liquid, means for integrating said rate of flow with respect to time to determine the total amount of liquid withdrawn from said total quantity, means for indicating the amount of liquid withdrawn as thus determined; and means for periodically correcting the amount of liquid so indicated by said indicating means, said correcting means comprising liquid level-responsive means disposed and arranged to respond to the level of the remainder of said total quantity of liquid, means for comparing the amount of liquid as indicated by said liquid level-responsive means with the amount of liquid as indicated by said indicating means, and automatic means responsive to any discrepancy between the values so compared for periodically and automatically correcting the indication given by said indicating means to correspond with the amount of liquid sensed by said level-responsive means.

9. A liquid use-measuring system for a plurality of liquid tanks having a common outlet to a point of use, comprising means for measuring the rate of flow of liquid through said outlet, means for integrating the rate of flow of liquid against time to determine the total amount used, indicating means normally controlled by said integrating means for indicating the amount of liquid used; liquid quantity-responsive means in each of said tanks for accurately determining the quantity of liquid remaining therein, first electrical means actuated by said integrating means for providing a first electrical value proportional to the total amount of liquid used in accordance with said integrating means, second electrical means actuated by said liquid quantity-responsive means for providing a second electrical value which is accurately proportional to the amount of liquid remaining in said tanks, and means controlled by the difference between said first and second electrical values for periodically and automatically adjustably correcting the value shown by said indicating means to correspond with the amount of liquid in said tanks as accurately determined as aforesaid.

10. A liquid quantity-measuring system for determining the amount of liquid withdrawn from a predetermined total quantity, comprising rate of flow measuring means located in the path of flow of said liquid, means for integrating said rate of flow with respect to time to determine the total amount of liquid withdrawn from said total quantity, means for indicating the amount of liquid withdrawn as thus determined; and means for periodically correcting the amount of liquid so indicated by said indicating means, said correceting means comprising liquid level-responsive means disposed and arranged to be accurately responsive to the amount of liquid remaining of said total quantity, including a variable electrical impedance, the impedance value of which is controlled to be a predetermined function of the liquid level; a second variable electrical impedance, the value of which is varied in response to the value indicated by said indicating means; electric circuit means for comparing the value of said electrical impedances and for producing an electrical output responsive to a difference therebetween; and means periodically effective (a) to correct the setting of said indicating means in response to said output to cause it to correspond with the amount of liquid withdrawn as accurately determined by said level-responsive means, and (b) to return the control of said indicating means to said integrating means once said output has been reduced substantially to zero.

References Cited in the file of this patent

UNITED STATES PATENTS

| | | |
|---|---|---|
| 2,448,616 | Oakley et al. | Sept. 7, 1948 |
| 2,656,977 | Cummings | Oct. 27, 1953 |

UNITED STATES PATENT OFFICE
Certificate of Correction

Patent No. 2,860,511                                                   November 18, 1958

Arthur Wickesser

It is hereby certified that error appears in the printed specification of the above numbered patent requiring correction and that the said Letters Patent should read as corrected below.

Column 5, line 23, for "(as viewed in Figure 1a) on energizing the relay" read —(as viewed in Figure 1a on energizing the relay)—; column 9, line 74, for "for" read —from—; column 10, line 39, for "contractor" read —contactor—; line 40, after "output" insert —in—; column 12, line 15, for "correceting" read —correcting—.

Signed and sealed this 17th day of March 1959.

[SEAL]

Attest:
KARL H. AXLINE,
*Attesting Officer.*
                                                                                              ROBERT C. WATSON,
*Commissioner of Patents.*